(12) United States Patent
Rittenhouse

(10) Patent No.: US 7,772,741 B1
(45) Date of Patent: *Aug. 10, 2010

(54) WIND TURBINE GENERATOR

(76) Inventor: Norman P. Rittenhouse, 1001 N. First St., Fairbury, IL (US) 61739

( * ) Notice: Subject to any disclaimer, the term of this patent is extended or adjusted under 35 U.S.C. 154(b) by 43 days.

This patent is subject to a terminal disclaimer.

(21) Appl. No.: 12/313,928

(22) Filed: Nov. 26, 2008

Related U.S. Application Data

(60) Provisional application No. 61/005,075, filed on Nov. 30, 2007.

(51) Int. Cl.
*H02K 1/12* (2006.01)
*H02K 21/12* (2006.01)

(52) U.S. Cl. .......................... 310/257; 310/43; 310/44; 310/216.023; 310/216.025; 310/216.029

(58) Field of Classification Search .......... 310/216.023, 310/216.025–216.033, 216.035, 216.066–216.067, 310/216.112, 254.1, 42, 43, 44, 49 R, 156.08, 310/156.12–156.31, 257; 290/43–44, 54–55
See application file for complete search history.

(56) References Cited

U.S. PATENT DOCUMENTS

| 5,483,113 | A  | * | 1/1996  | Sakuragi et al. ........... 310/67 R |
|-----------|----|---|---------|--------------------------------------|
| 5,861,695 | A  | * | 1/1999  | Brassard ................. 310/156.43 |
| 6,153,953 | A  | * | 11/2000 | Isozaki et al. ......... 310/216.112 |
| 7,492,074 | B1 | * | 2/2009  | Rittenhouse ................. 310/257 |
| 7,526,926 | B2 | * | 5/2009  | Rasmussen et al. ........... 62/619 |
| 7,579,742 | B1 | * | 8/2009  | Rittenhouse ................ 310/257 |
| 2006/0186671 | A1 | * | 8/2006 | Honda et al. .................. 290/54 |
| 2006/0208602 | A1 | * | 9/2006 | Enomoto et al. ............ 310/257 |

* cited by examiner

*Primary Examiner*—Tran N Nguyen
(74) *Attorney, Agent, or Firm*—Philip L. Bateman

(57) ABSTRACT

A wind turbine generator produces alternating current. The generator contains an inner cylindrical stator and an outer cylindrical rotating housing. The stator has a transverse row of molded magnetic flux members mounted on its exterior wall and a metal conductor running through a continuous transverse channel defined by the flux members. The rotating housing has a transverse row of permanent magnets mounted on the interior wall of the outer cylinder. Rotation of the housing causes the permanent magnets to induce magnetic fields in the flux members that induce an alternating current in the metal conductor.

20 Claims, 12 Drawing Sheets

WIND TURBINE GENERATOR

CROSS-REFERENCE TO RELATED APPLICATION

This application claims the benefit of U.S. Provisional Application Ser. No. 61/005,075, Nov. 30, 2007.

FIELD OF THE INVENTION

This invention relates to generators that produce electric current from wind turbines.

BACKGROUND OF THE INVENTION

Electricity is a form of energy arising from the interaction of electrically charged particles. Most of the electricity used is in the form of flowing negatively-charged electrons in metal wires, known as electric current. There are two basic types of electric current. Direct current (DC) always flows in the same direction whereas alternating current (AC) regularly reverses the direction of flow. The magnitude of electric current is measured in amperes and the potential for current between two points is measured in volts. Electric current is frequently converted from one type to the other. Devices that convert direct current to alternating current are known as inverters and devices that convert alternating current to direct current are known as rectifiers. Alternating current is much more widely used than direct current because it can be transmitted with less loss and because its voltage can be easily and efficiently increased or decreased in devices known as transformers.

Industrialized countries have vast, interconnected power grids for transmitting alternating current. The voltage is typically greater than 500,000 volts in major transmission lines, about 2,000 to 10,000 volts in local grids, and about 100 to 240 volts for residential use. The alternating current typically has a frequency of either 50 or 60 hertz, i.e., it completes a cycle 50 or 60 times each second. For example, most consumers in the United States receive electricity at 120 volts and 60 hertz whereas most consumers in Europe receive electricity at 230 volts and 50 hertz.

Electricity and magnetism are related forces and both generate force fields that can affect other objects even without direct contact. For example, a moving electric field produces magnetism in nearby magnetic materials and a moving magnetic field produces electrical current in nearby conductive materials. Electricity is commonly created in generators (sometimes known as dynamoelectrics or dynamos) by rotating a magnetic field around metal wire so that current is induced (generated) in the wire. The part of the generator that remains stationary is commonly known as the stator and the part of the generator that rotates is commonly known as the rotor. Generators can produce either direct current or alternating current. In an alternating current generator, the speed at which the rotor rotates determines the frequency of the alternating current produced.

A variety of mechanisms are used to move the rotor in a generator. For example, small household generators typically use an internal combustion engine to turn the rotor. Larger generators use a turbine consisting of a series of blades on a shaft. The blades are contacted by a flowing fluid which rotates the turbine shaft which, in turn, rotates the rotor in the generator. Hydroelectric generators at large dams use turbines that are rotated by falling water. Most power plants use turbines that are rotated by flowing steam, which is produced by burning a fuel (coal, gas, oil, etc.) or by conducting a nuclear reaction. Generators can also be powered by turbines that are rotated by wind. Producing electricity using wind turbines has many environmental advantages and is becoming increasingly popular. For example, approximately twenty percent of all electrical power in some northern European countries is produced from wind turbines.

A wind turbine generator typically includes a turbine consisting of three or four large blades mounted on a variable pitch hub. The variable pitch hub enables the desired rotational speed to be obtained over a wider range of wind velocities. The hub is connected to a shaft that is, in turn, connected to a step-up gearbox that increases the rotational speed by as much as one hundred times to achieve the desired frequency of the alternating current. The output shaft from the gearbox then turns a conventional alternating current generator. The phrase "wind turbine generator" is used herein to refer to the generator itself and the phrase "wind turbine generator system" is used to refer to the generator system (including the generator, turbine, and linkage between the generator and turbine) unless the context indicates otherwise.

A large number of wind turbine generators and wind turbine generator systems have been disclosed, including those in Kirschbaum, U.S. Pat. No. 4,291,233, Sep. 22, 1981; Appel, U.S. Pat. No. 4,606,697, Aug. 19, 1986; Kollitz et al., U.S. Pat. No. 5,375,968, Dec. 27, 1994; and Mikhail et al., U.S. Pat. No. 6,137,187, Oct. 24, 2000.

Conventional wind turbine generators and wind turbine generator systems suffer from several disadvantages. One disadvantage of the systems is that the frictional losses in a step-up gearbox reduce the energy transmitted to the generator. Approximately twenty percent of the energy captured by the wind turbine is lost in the gearbox. The heat generated in the gearbox often requires a separate oil cooler and fan. Another disadvantage is that the gearbox, cooler, and fan contain many moving parts which require maintenance and are prone to failure.

Accordingly, there is a demand for an improved wind turbine generator and wind turbine generator system. More particularly, there is a demand for a generator that is directly driven by the wind turbine. There is also a demand for a system that eliminates the gearbox and that has an overall efficiency of greater than about ninety-five percent.

SUMMARY OF THE INVENTION

The general object of this invention is to provide an improved wind turbine generator and an improved wind turbine generator system. A more particular object of this invention is to provide a wind turbine generator that is directly driven by the wind turbine. Another more particular object is to provide a wind turbine generator system with a direct drive that eliminates the gearbox and that achieves an overall efficiency of greater than about ninety-five percent.

I have invented an improved wind turbine generator of alternating current. The generator comprises a stator and a rotating housing. The stator comprises: (1) an inner cylinder having a radial exterior wall, an axis, and a diameter; (2) a transverse row of an even number of identical molded magnetic flux members mounted on the exterior wall of the inner cylinder, each flux member having a central opening to define a continuous transverse channel around the exterior wall of the cylinder, each flux member made from a material having a high magnetic permeability; and (3) a metal conductor running through the continuous transverse channel defined by the flux members, the conductor having two ends to supply alternating current.

The housing comprises: (1) an outer cylinder having a radial interior wall, an axis that is coaxial with the axis of the stator inner cylinder, and a diameter that is greater than the diameter of the stator inner cylinder, the outer cylinder positioned in an overlapping relationship with the stator inner cylinder; and (2) a transverse row of identical permanent magnets mounted on the interior wall of the outer cylinder, each magnet having a North and South pole oriented radially, the magnets having alternating North and South poles.

As explained in detail below, the rotation of the housing causes the magnets to induce magnetic fields in the flux members that, in turn, induce an alternating electric current in the metal conductor. The current produced is either at, or easily converted to, the desired voltage and frequency by conventional means.

The wind turbine generator is directly driven by the wind turbine. This, in turn, enables a wind turbine generator system to be provided with a direct drive that eliminates the gearbox and that achieves an overall efficiency of greater than ninety-five percent.

I have also invented an improved wind turbine generator system that includes the generator previously described in combination with a turbine and a linkage between the generator and the turbine.

I have further invented an improved generator and motor. Supplying rotation to the housing of the apparatus previously described by any means induces an electric current in the metal conductor. Supplying an electric current to the metal conductor of the apparatus previously described creates rotation of the housing.

DETAILED DESCRIPTION OF THE INVENTION

1. The Wind Turbine Generator and System in General

Figure 1:
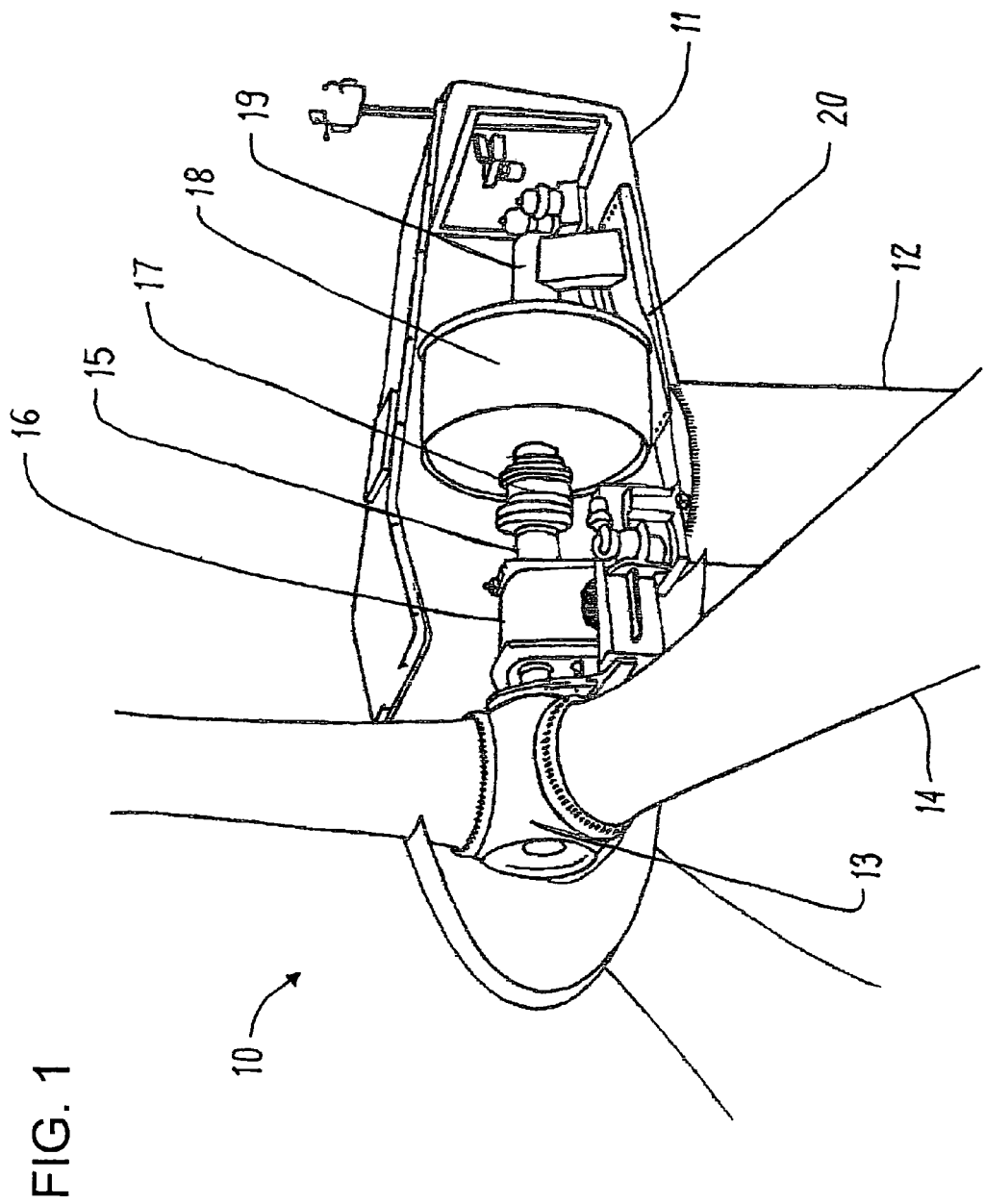
FIG. 1 is a perspective view of a first embodiment of a wind turbine generator system.
Figure 2:
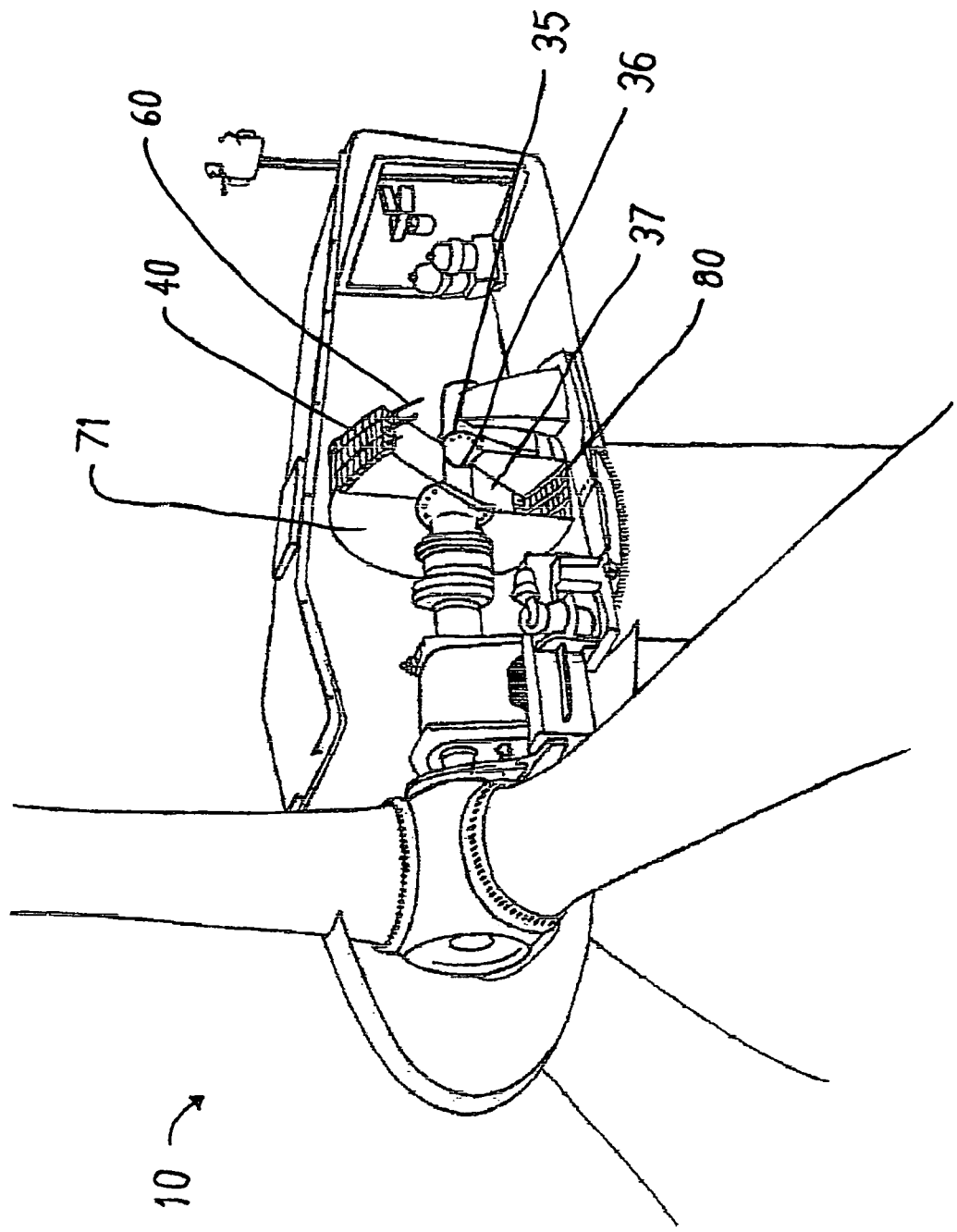
FIG. 2 is a perspective view thereof with the generator shown in partial section.

This invention is best understood by reference to the drawings. Referring first to FIGS. 1 and 2, a first embodiment of the wind turbine generator system 10 of this invention is mounted within a shell 11 on top of a tall pole 12. Elevating the wind turbine is desirable because sustained wind velocities are generally higher away from the uneven ground surface. Many commercial wind turbines are mounted over two hundred feet above the ground. The shell is rotatable upon the pole so that it can be oriented to face the direction of the prevailing winds as detected by an anemometer or other detection apparatus. The wind turbine comprises a variable pitch hub 13 containing three blades 14. The variable pitch hub enables the rotational speed of the hub to be held relatively constant throughout a range of wind velocities. The hub is connected to an output shaft 15 that is supported by a thrust bearing assembly 16. The output shaft is, in turn, connected to a flexible shock coupling 17. The flexible shock coupling absorbs vibrations and thereby provides a more uniform rotational speed. These components of the wind turbine system are conventional and available commercially.

The output shaft from the flexible shock coupling is connected to the front side of a generator 18. The generator is of the alternating current, permanent magnet, synchronous type. The non-rotating, back side of the generator is connected to a conventional anti-torque device 19. Both the generator and the anti-torque device are mounted to a base 20 that is, in turn, mounted to the shell and the pole. The wind turbine system contains various other conventional elements that are omitted for brevity.

Figure 3:
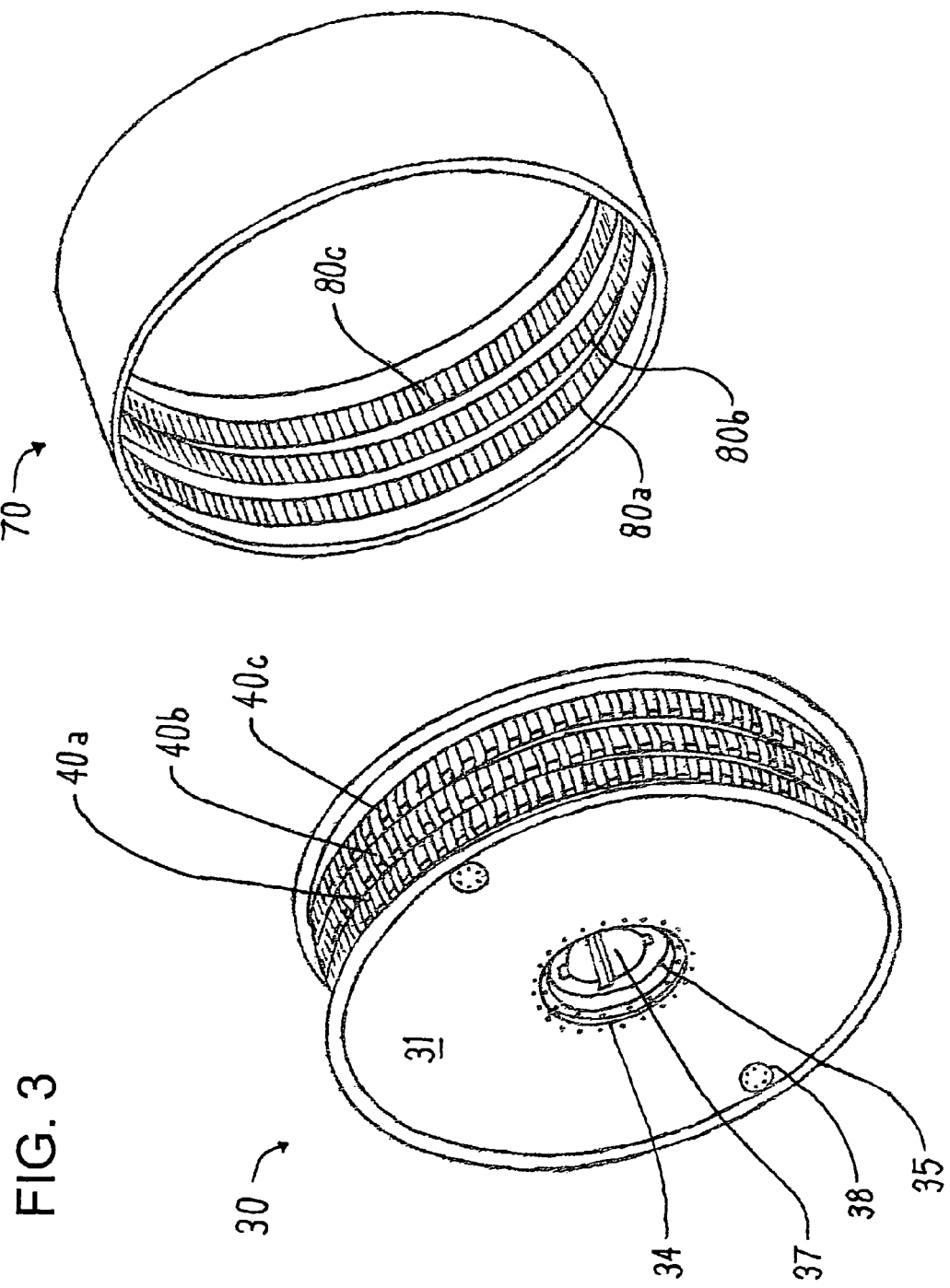
FIG. 3 is an exploded perspective view of the stator and housing of the generator.

Referring now to FIG. 3, the generator has two primary components, a stationary inner stator 30 and a rotating outer housing 70. The stator and the rotating housing are both cylindrical in shape with co-axial horizontal axes. The stator fits inside the rotating housing in an overlapping relationship as best seen in FIG. 2. As explained in more detail below, the rotation of the housing relative to the stationary stator induces an alternating electrical current in the metal conductor of the stator.

Figure 4:
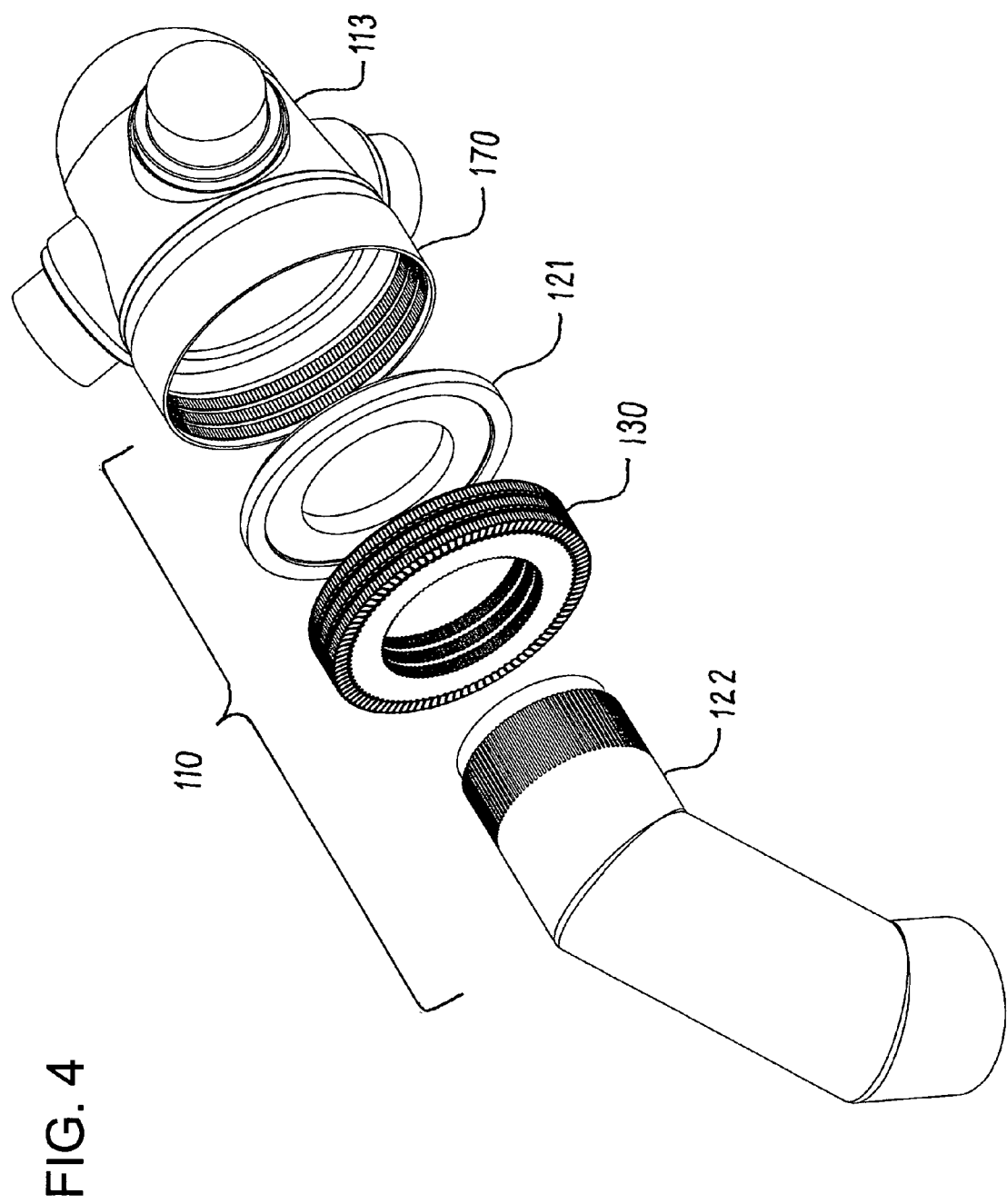
FIG. 4 is a perspective view of a second embodiment of a wind turbine generator system.

An alternate embodiment of the wind turbine generator system 110 is shown in FIG. 4. In this embodiment, the variable pitch hub 113 is integrated with the housing 170 of the generator. A bearing 121 fits between the integrated hub/housing and the stator 130. The non-rotating stator is supported by shaft 122. Integration of the hub and generator housing eliminates numerous parts, including the output shaft, thrust bearing assembly, and flexible shock coupling.

2. The Stator of the Generator

Referring again to FIG. 3, the stator 30 is cylindrical in shape and has a front face 31, a rear face 32 (hidden from view), and an exterior wall 33 (hidden beneath the flux members discussed below) extending between the two faces. In the preferred embodiment, the front face and the rear face have diameters slightly larger than the diameter of the wall which gives the stator the shape of a spool. The stator contains a central opening 34 and a bearing 35 for accommodating a stationary mounting shaft 36 that is mounted to the base of the system. A hub 37 is splined on the end of the mounting shaft. The hub is preferably made of a magnetically inert material such as fiberglass to eliminate magnetic losses. Access ports 38 in the front face are useful for inspections. Similar openings in the rear face are used for routing the ends of the metal conductors, described below.

Figure 7:
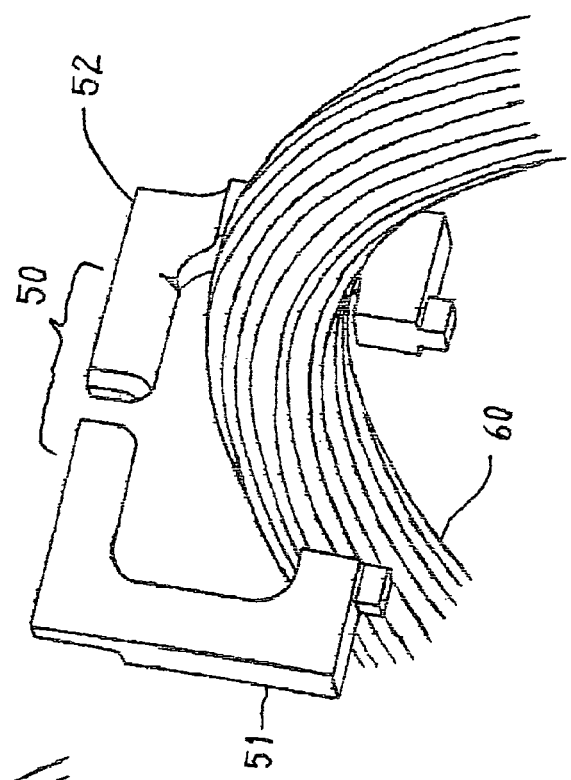
FIG. 7 is a detailed view of a flux member and a portion of the metal conductor.
Figure 8:
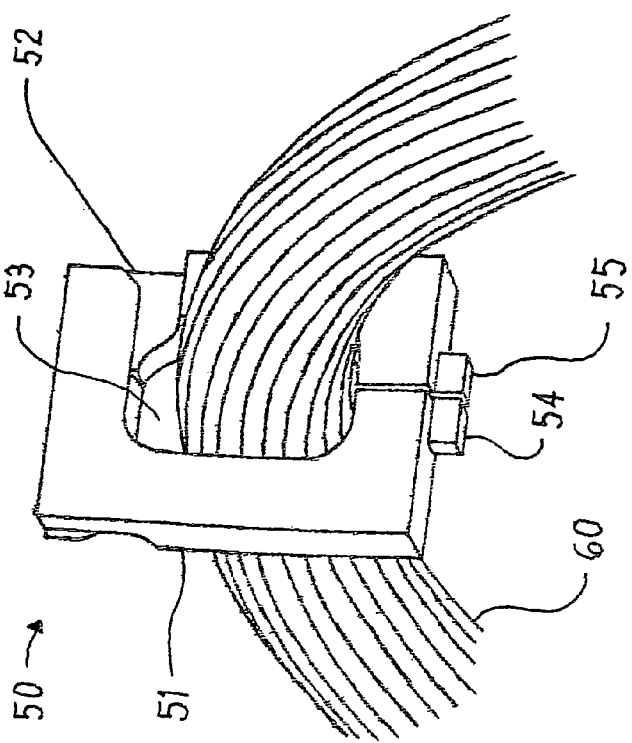
FIG. 8 is an exploded detailed view thereof.
Figure 9:
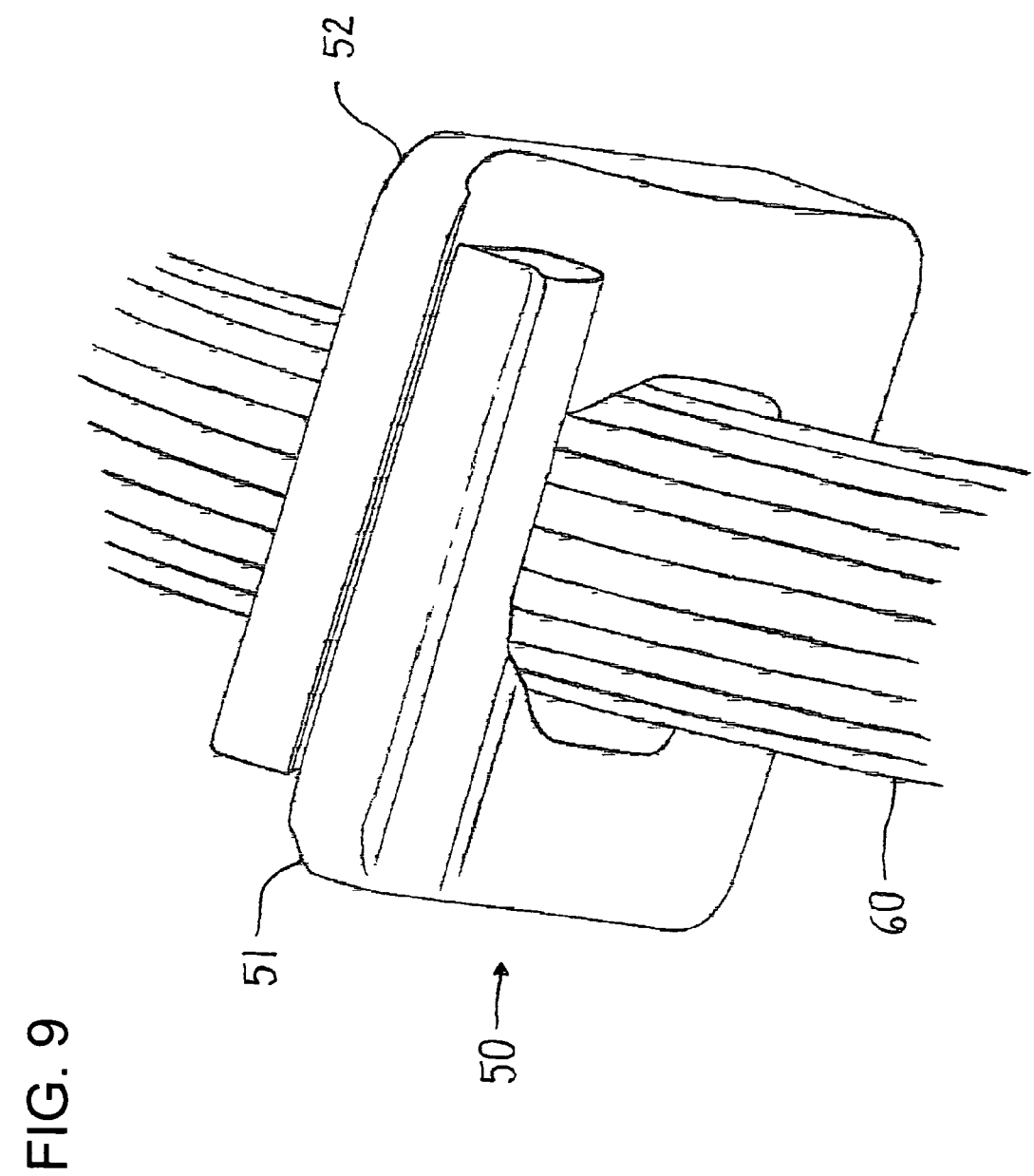
FIG. 9 is a detailed view thereof from a different perspective.

Mounted onto the exterior wall of the cylinder is a transverse row 40 of molded magnetic flux members 50. The flux members are mounted adjacent each other with little or no spacing so that they form a continuous row. Referring now to FIGS. 7 to 9, the individual flux members 50 are formed of two mating parts 51 and 52. When joined together in a partially overlapping relationship, the two parts form an enclosure having a central opening 53. The openings in each row of flux members thus form a continuous transverse channel around the cylinder.

The number of flux members in a row is generally an even number. The magnitude of the number, together with the speed of rotation, determines the frequency of the alternating current generated. In the first embodiment, a row contains 180 flux members, each of which is formed of the two mating parts as discussed above.

The means by which the flux members are mounted to the exterior wall of the cylinder is a matter of choice. In the preferred embodiment, the two parts of each flux member contain tabs 54 and 55 that engage complementary openings in the exterior wall. An adhesive is used to further secure the flux members to the exterior wall.

The flux members are made of a material having a high magnetic permeability. The flux members are preferably molded from nickel-iron sintered material having a near linear magnetic saturation curve with a maximum magnetic saturation of greater than about 1.5 Tesla. Producing the flux members by molding enables their shape to be optimized so that they nearly completely surround the metal conductor, both axially and radially, as discussed in more detail below.

A metal conductor 60 runs through the continuous transverse channel formed by the flux members. As discussed in more detail below, an alternating electrical current is induced in the metal conductor as the housing of the generator rotates about the stator. The metal conductor is preferably formed of multiple windings of copper wire. Copper is preferred because of its high electrical conductivity and relatively low cost. For a given cross-sectional area of conductor, increasing the number of wires and decreasing their diameter (gauge) produces greater voltage and less amperage. Conversely, decreasing the number of wires and increasing their diameter produces less voltage and greater amperage. The windings make only a slight (i.e., a relatively large radius) bend around the cylinder so there is no limitation on their diameter, in contrast to conventional generators in which the metal conductors must make bends having a very short radius.

The ends of the metal conductor exit through the rear face of the stator and supply the generated current to a conversion mechanism, typically located at ground level. The conversion mechanism ensures that alternating current of the desired voltage, frequency, and phase is delivered to the local power grid. Suitable conversion mechanisms are discussed in detail below.

Figure 5:
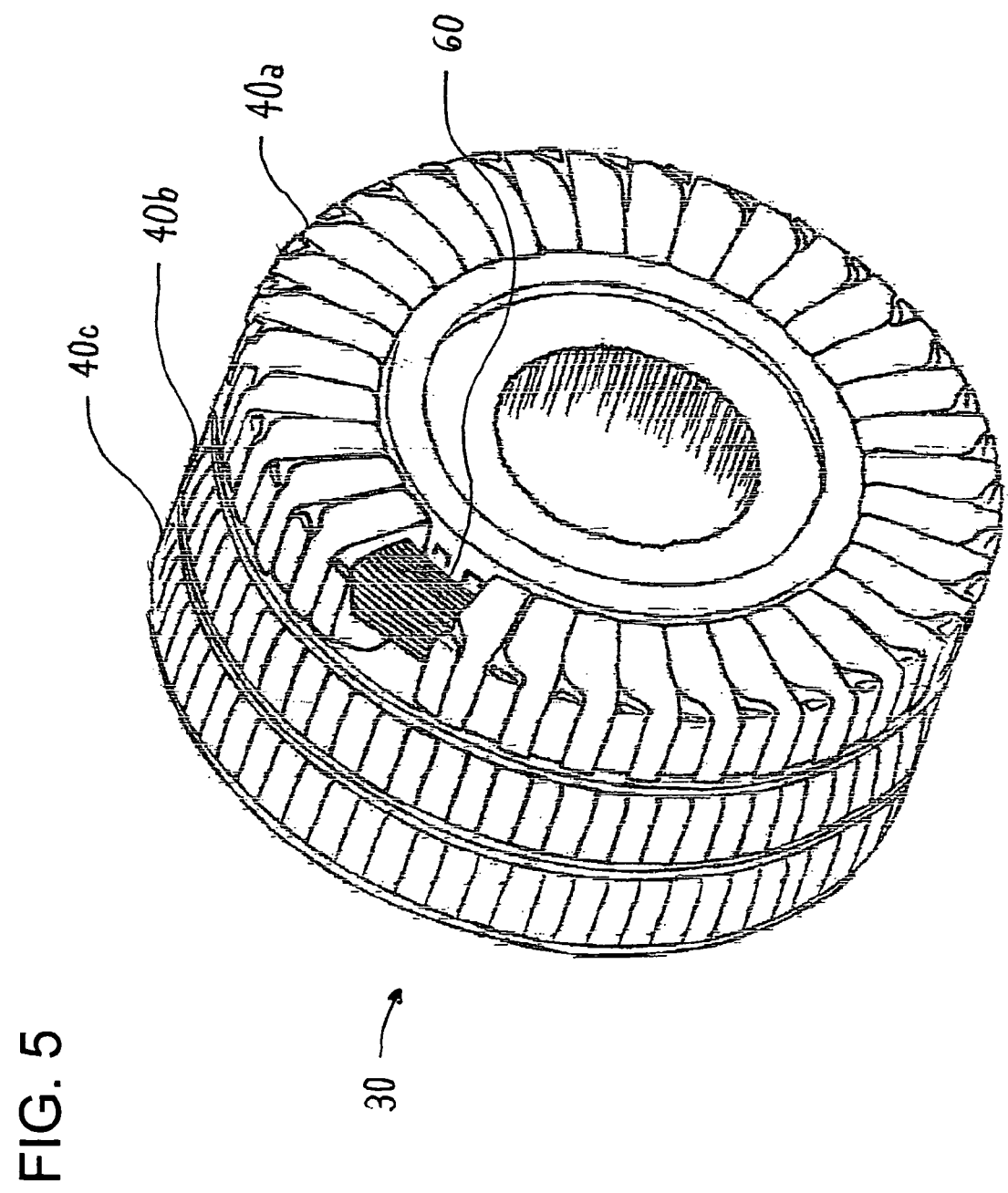
FIG. 5 is a perspective view of a portion of the stator.

In the first embodiment, three contiguous transverse rows 40a, 40b, and 40c of flux members and metal conductors are mounted onto the exterior wall. The second row 40b is offset from the first by −0.667 mechanical degrees and the third row 40c is offset from the first by −1.33 mechanical degrees. As discussed in detail below, the offset rows create three separate alternating currents, each of which is offset by 120 electrical degrees. FIG. 5 shows the three contiguous transverse rows of flux members and omits two of the flux members from row 40a to show one of the three metal conductors. In FIG. 5, the front and rear faces of the stator are omitted for illustration purposes.

3. The Rotating Housing of the Generator

The rotating housing 70 of the first embodiment is cylindrical in shape and has a front face 71, a rear face 72, and an interior wall 73. In FIG. 3, the front and rear faces are omitted so that the interior wall can be seen. The front face of the housing is connected to the output shaft of the flexible shock coupling. It can be appreciated that rotation of the wind turbine causes rotation of the housing at the same speed.

Mounted to the interior wall of the housing is transverse row 80 of permanent magnets 90. The magnets are mounted adjacent each other with little or no spacing so that they form a continuous row.

The means by which the magnets are mounted to the interior wall is a matter of choice. In the preferred embodiment, the magnets are attached with adhesive.

Each magnet is oriented with its North and South poles oriented radially to the axis of rotation of the housing. Adjacent magnets have alternating poles so that they attract, rather than repel, each other.

The number of magnets in a row is generally an even number. The magnitude of the number is preferably equal to twice the number of flux members in a row of the stator. In the preferred embodiment, a row contains 360 magnets.

The magnets are made of a magnetic material having a very high field strength. Neodymium-iron-boron magnets are preferred because they have the highest field strength of commercially available permanent magnets.

Figure 6:
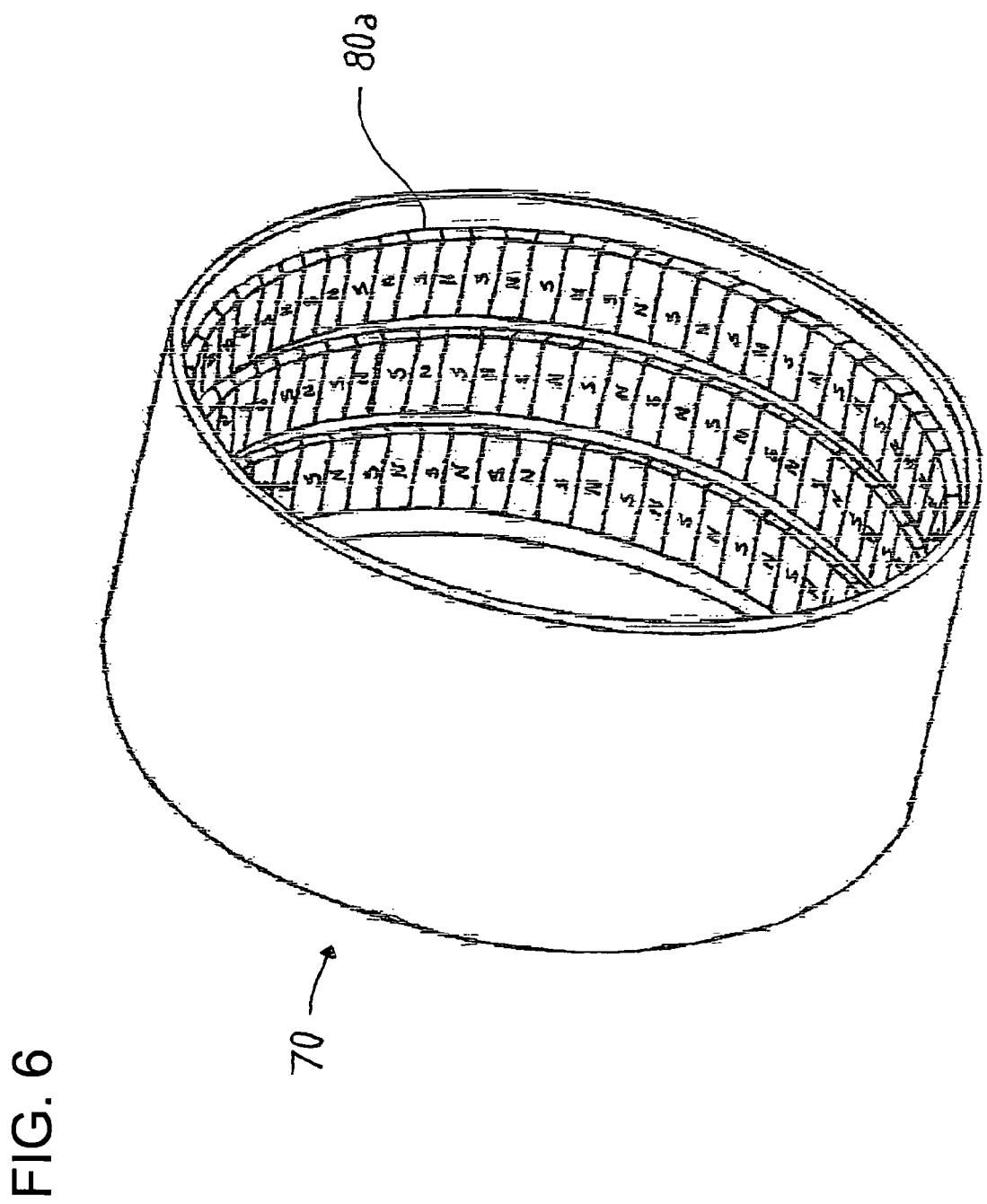
FIG. 6 is a perspective view of a portion of the housing.

In the first embodiment, three contiguous transverse rows 80a, 80b, and 80c of magnets are mounted onto the interior wall to correspond with the three transverse rows of flux members on the exterior wall of the stator. FIG. 6 shows the three contiguous rows of magnets with the North and South poles indicated by the abbreviations "N" and "S."

4. Operation

The operation of the generator can now be considered in more detail. As previously discussed, rotation of the wind turbine causes the housing of the generator to rotate around the stationary stator. This, in turn, causes the magnets to rotate past the flux members. As a given magnet rotates past a given flux member part, it induces a magnetic field in the flux member part. The induced magnetic field has the opposite direction of the field in the magnet. An oppositely directed magnetic field is simultaneously induced in the mating flux member part. The induced magnetic fields in the two mating parts of the flux member combine to induce an electrical current in the metal conductor.

As the next magnet (one having the opposite polarity of the first magnet) rotates past the flux member part, the induced magnetic fields in the flux member parts and the induced electrical current are both reversed. Thus, a complete alternating current cycle is completed with each passage of two magnets past a flux member. The rotational speed of the housing and the number of flux members and magnets thus determines the frequency of the alternating current generated. In the first embodiment containing 180 flux members (360 flux member parts) and 360 magnets, rotation of the housing at 20 revolutions per minute generates an alternating current of 60 hertz calculated as follows:

$$\text{Frequency of alternating current} = (20 \text{ revolutions/minute})(1 \text{ minute/}\\60 \text{ seconds})(360 \text{ magnets/}\\\text{revolution})(1 \text{ cycle/2 magnets})\\= 60 \text{ cycles/second}\\= 60 \text{ hertz}$$

The voltage of the generated alternating current is a function of many factors, including the field strength of the permanent magnets, the magnetic permeability of the flux members, the diameter and number of the windings, etc. These parameters can be chosen so that the voltage matches that of the local power grid, thus enabling the generated alternating current to be added to the grid without the need for a step-up or step-down transformer. In conditions of relatively constant wind velocities, voltage regulation is generally not required due to the synchronous, low impedance properties of the generator. As described below, the generated alternating current can alternatively be rectified to direct current, regulated, and then inverted back to alternating current before being added to the local power grid.

In the first embodiment, the three rows of flux members and magnets produce three phases of highly accurate sine wave alternating current, each of which is offset by 120 electrical degrees because of the physical offset of the three rows of flux members. It can be appreciated that the same result is also achievable with offset rows of magnets and aligned rows of flux members. Each phase is physically, magnetically, and electrically isolated from the others. Each phase is configured as Wye or Delta using conventional methods.

5. Flux Member and Magnet Geometry

Figure 10:
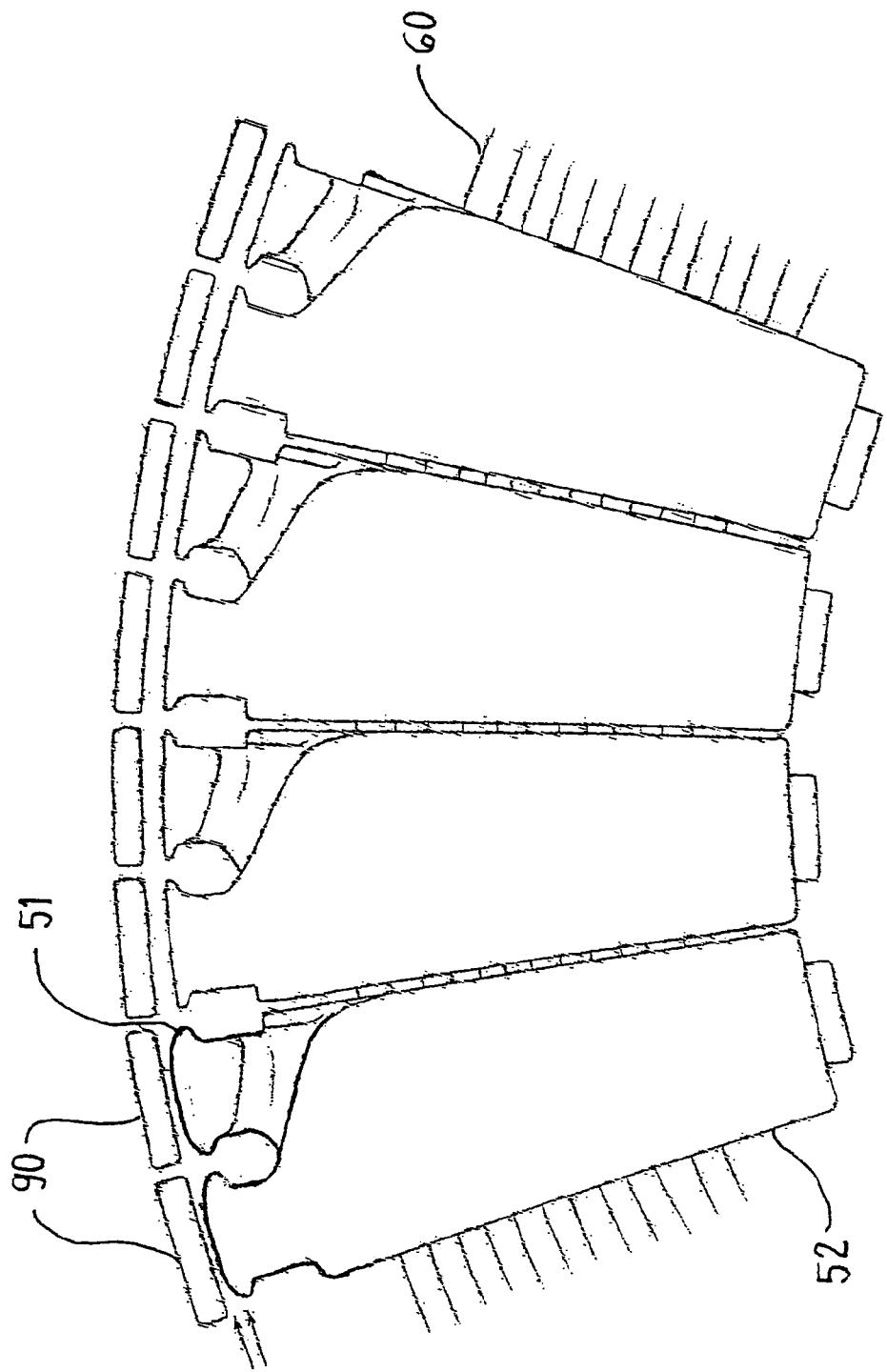
FIG. 10 is a detailed side view of four flux members and eight magnets.

As discussed above, the magnets induce magnetic fields in the flux members that, in turn, induce alternating current in the metal conductor. Other things being equal, reducing the distance between the permanent magnets and flux members increases the induced magnetic field and voltage of the current. The geometry of the flux members and the magnets affect the wave pattern of the alternating current generated. In FIG. 10, two different flux members are shown for illustration purposes. In an actual embodiment, the flux members are identical. In FIG. 10, the flux member at the far left has a rounded upper surface whereas the other three flux members have flat upper surfaces. It can be appreciated that the rounded upper surface produces a sine wave pattern to the induced current that is often highly desirable.

Figure 11:
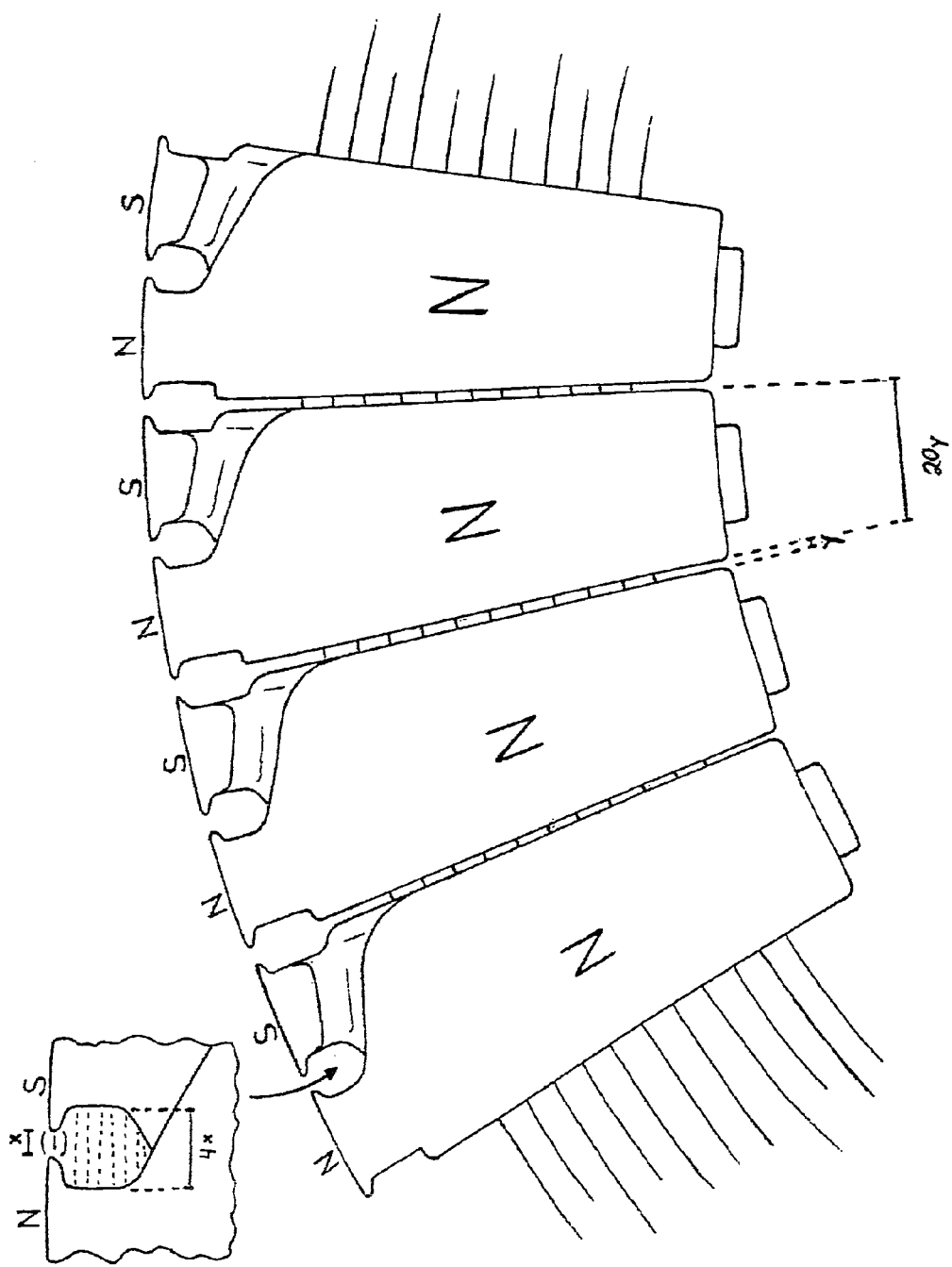
FIG. 11 is a detailed side view of four flux members.

Whether operating as a generator or as a motor, efficiency is optimized by maximizing the transfer of magnetic flux across the air gap between the permanent magnets of the housing and the flux members of the stator. The shape of the flux members contributes to the efficiency. Referring to FIG. 11, it can be seen that there is a gap between poles of opposite magnetic polarity labeled "X." The gap is preferably about 0.2 inches. Some loss of magnetic flux between the facing edges of the two opposite poles is unavoidable. To minimize this loss, the edge width is reduced to the minimum distance that can convey flux to or from the air gap with the permanent magnets.

Between the poles, the remainder of the pole faces is undercut, so that the distance between opposite pole faces is approximately four times the top gap between the poles. This distance minimizes the flux loss between opposite poles of the main body of the poles. Because the magnetic flux loss decreases as the square of the distance between the surfaces, it can be seen that undercutting the poles so that the distance in increased by a factor of four decreases the magnetic loss by a factor of sixteen.

Looking at the main body of the flux members, it can be seen that the gap between the adjacent members is the minimum needed for assembly, labeled "Y." There is no magnetic loss at this gap because the magnetic polarity of the bodies are the same at any moment of time. The drawing shows all the flux members as "North" with the present direction of current flow in the transverse metal conductor. The ratio of the average width of the flux member to the assembly gap "Y" is preferably at least 20 to 1, as indicated by the dimension labeled "20Y." It has been found that at least 95 percent of the available flux is either captured or coupled to the magnetic pole air gap. This represents a large improvement over prior art generators and motors that typically have flux capture/conversions of about 50 percent.

Figure 12:
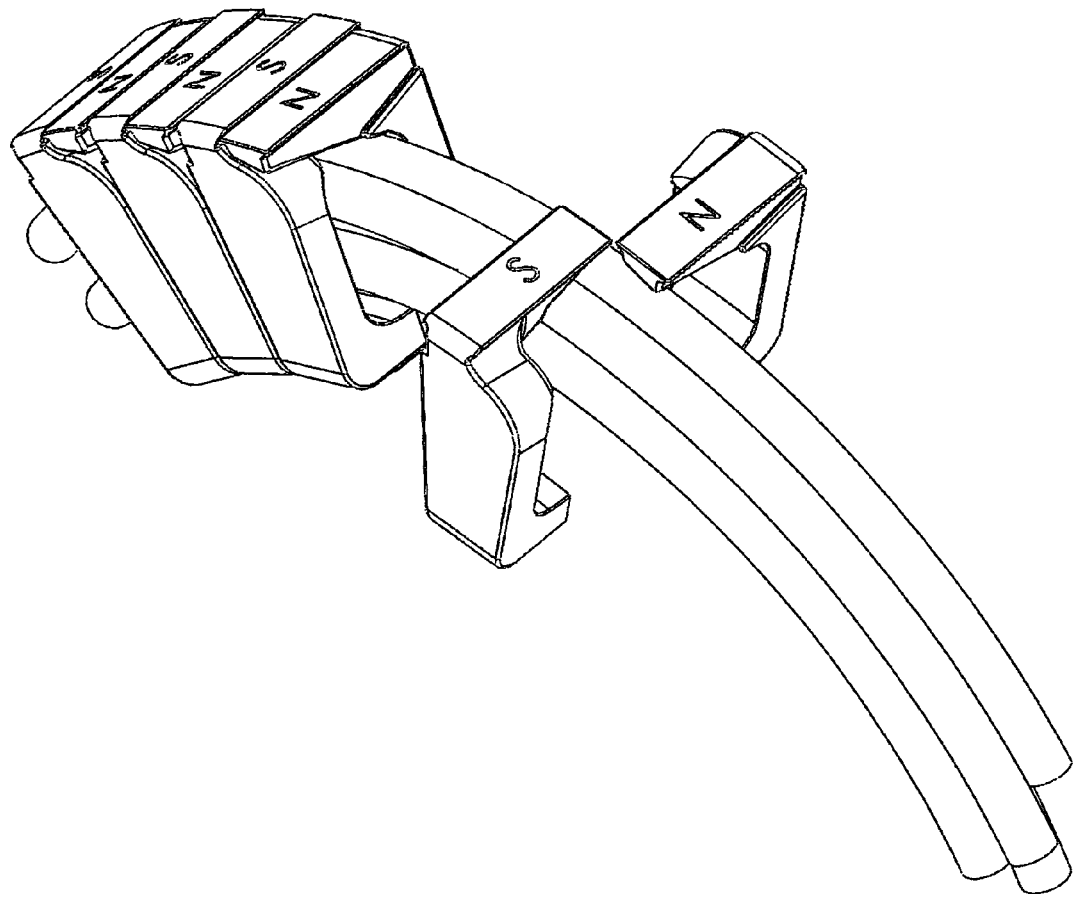
FIG. 12 is a detailed perspective view of four flux members.

A slightly different shape of flux member is shown in FIG. 12. This shape was used in the generator described below in Example 2.

6. Conversion of the Current

As described above, the frequency of the alternating current produced by the generator is a function of the speed at which the housing rotates. Although the pitch of the blades on the hub is adjustable to maintain the speed of rotation as constant as possible, some variation is inevitable in geographic locations where the wind speed varies dramatically. Accordingly, it is desirable to include a means for ensuring an alternating current of an exact voltage, frequency, phase, and wave form.

Figure 13:
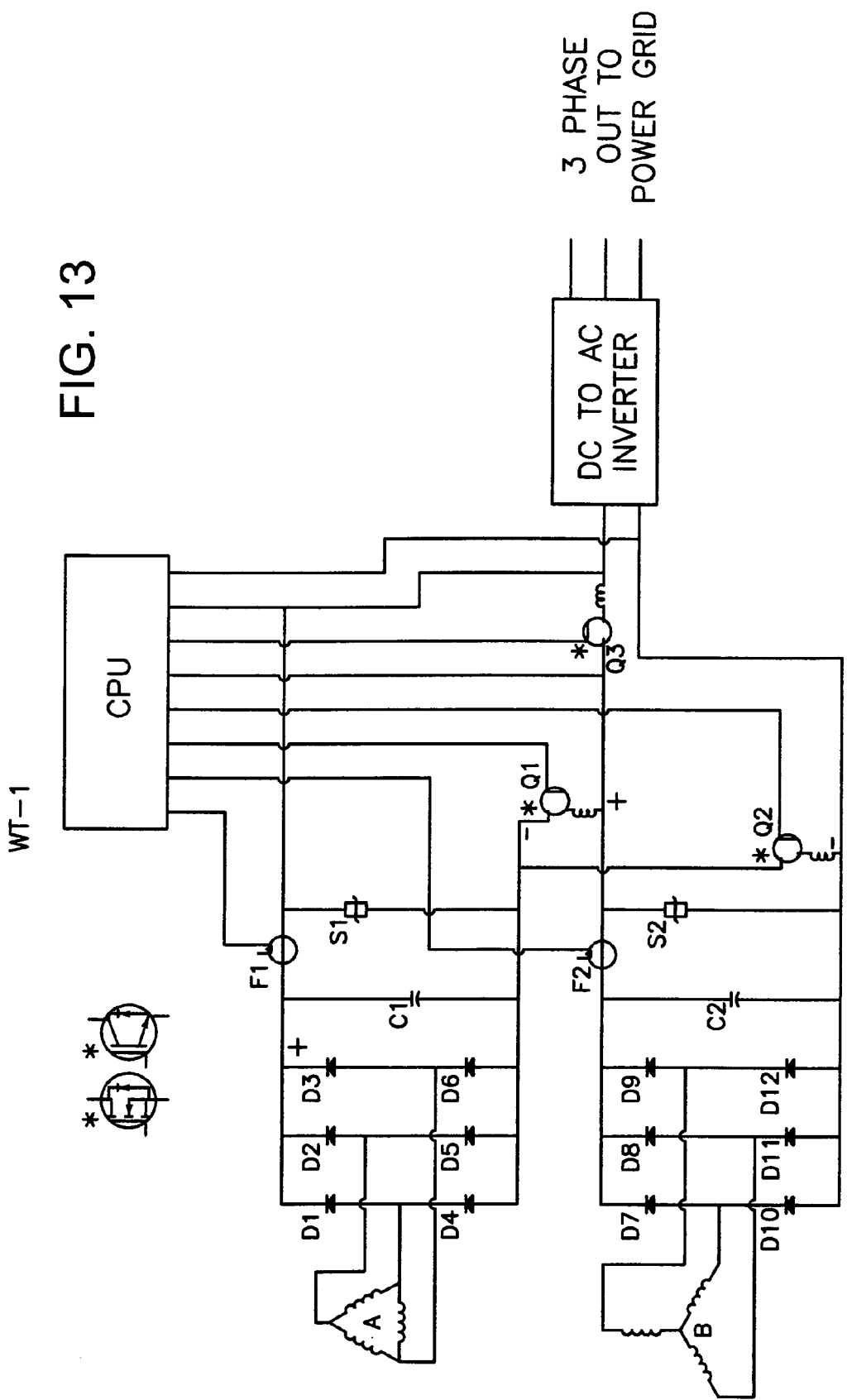
FIG. 13 is a schematic diagram of a circuit that rectifies and then inverts the generated alternating current.

A schematic diagram of the preferred means for ensuring a constant voltage is shown in FIG. 13. The alternating current generated is first rectified to direct current. The direct current may vary slightly in voltage depending upon the speed of rotation of the hub and housing. To compensate for the variation, the circuit contains two pulse width modulated series regulators that adjust the direct current to a constant voltage. The constant voltage direct current is then inverted to alternating current of the desired voltage, frequency, phase, and wave form using conventional equipment.

The primary advantage of converting the alternating current to direct current and then back to alternating current is that the properties of the alternating current sent to the power grid remain constant despite substantial fluctuations in the speed of rotation of the housing. For example, the alternating current sent to the power grid remains constant even as the speed of rotation of the hub and housing varies from about twelve to twenty-four revolutions per minute.

7. Advantages and Features

The wind turbine generator and system have numerous advantages and features. A partial list includes the following.

The generator is driven directly by the turbine so that a step-up gearbox is eliminated. This, in turn, reduces maintenance and eliminates the need for an auxiliary cooler and fan. It also increases efficiency and enables an overall efficiency of greater than about ninety-five percent.

The elimination of conventional salient wound stators and the use of snap-in flux members reduce manufacturing costs.

The rotating housing is the only moving part.

The flux member channels are electrically isolated for improved protection from lightning damage.

Each row of flux members and conductor of a multi-phase generator is physically, magnetically, and electrically isolated from each other.

Various undesirable properties of conventional generators are eliminated or reduced, including splices, excessive inductance, phase lag, cogging effect, interactive "armature effect" between phases, circulating currents between paralleled circuits, and eddy currents in all three planes.

8. Alternate Uses

The generator is especially useful in a wind turbine system for the reasons previously discussed. However, the generator is also useful in producing alternating electric current regardless of the application or means for rotating the housing. For example, the housing of the generator can be rotated by water or steam turbines.

It can be appreciated that the generator of this invention is also useful as an electric motor. To operate as an electric motor, alternating electric current is supplied to the metal conductor. The electric current induces magnetic fields in the flux members that create rotation of the housing. The rotating housing is then mechanically coupled to produce mechanical movement.

9. Examples

The following examples are illustrative only.

Example 1

This example describes the construction and testing of a one-tenth scale model generator.

The stator cylinder was molded of fiberglass. It had an outside diameter of about six inches and a length of about twelve inches. Forty-eight flux members (ninety-six flux member parts) were molded of nickel-iron sintered material and attached to the outside wall to form three, contiguous, transverse rows of sixteen flux members (thirty-two flux member parts) per row. Each flux member had a height of about two inches, a width of about one inch, and a depth of about one and one-quarter inches. Each flux member had a rounded upper surface. A metal conductor consisting of 32 windings of 0.129 inch diameter copper wire was inserted into each of the three channels formed by the flux members. The stator was mounted on a stationary horizontal shaft.

The housing was constructed of steel. It had an inside diameter of about eleven inches. Ninety-six permanent neodymium-iron-boron magnets were attached to the inside wall to form three transverse rows of thirty-two magnets per row. The housing was attached to a rotatable shaft. The shaft was rotated at 225 revolutions per minute by an electric-motor.

The input torque was measured with a Transducer Technologies model SSM-500 load cell. The input speed was measured with an Automation Direct model TRD-S/SH incremental encoder. The electrical output was measured with a Precision Mastech Enterprises Company model MS2203 three phase digital power clamp meter. The data collection was performed with a National Instruments model USB 6259 signal processor. The waveform analysis was performed with an AEMC Instruments model OX 7104C oscilloscope.

The output voltage was 242.2 volts, or approximately 7.5 volts per pole. The average energy conversion efficiency was greater than 95 percent. The three phase alternating current was in the form of a sine wave with less than 2 percent harmonic distortion.

Example 2

This example describes the construction and testing of a forty-one percent scale model generator.

The generator was similar to the generator described in Example 1 except as follows. It had an outside diameter of about fifty-four inches and a length of about twenty-seven inches. It weighed about 7,300 pounds. The rotating housing was made of one-inch-thick steel with three rows of 72 permanent neodymium-iron-born magnets having a N48 rating. The stator contained three rows of thirty-six flux members which were offset by 3.33 mechanical degrees (120 electrical degrees).

At twenty revolutions per minute, each of the three metal conductors produced sine wave voltage of 286 voltage. The housing was then rotated at 48.8 revolutions per minute (a factor of 2.44 which equals one divided by forty-one percent) to correspond to a full size generator at twenty revolutions per minute. At 48.8 revolutions per minute, each of the three metal conductors produced sine wave voltage of 670 volts.

I claim:

1. A wind turbine generator of alternating current, the generator comprising:
   (a) a stator comprising:
      (i) an inner cylinder having a radial exterior wall, an axis, and a diameter;
      (ii) a transverse row of an even number of identical molded magnetic flux members mounted on the exterior wall of the inner cylinder, each flux member having a central opening to define a continuous transverse channel around the exterior wall of the cylinder, each flux member made from a material having a high magnetic permeability; and
      (iii) a metal conductor running through the continuous transverse channel defined by the flux members, the conductor having two ends to supply alternating current; and
   (b) a housing comprising:
      (i) an outer cylinder having a radial interior wall, an axis that is coaxial with the axis of the stator inner cylinder, and a diameter that is greater than the diameter of the stator inner cylinder, the outer cylinder positioned in an overlapping relationship with the stator inner cylinder; and
      (ii) a transverse row of identical permanent magnets mounted on the interior wall of the outer cylinder, each magnet having a North and South pole oriented radially, the magnets having alternating North and South poles;
   such that rotation of the housing causes the magnets to induce magnetic fields in the flux members that induce an alternating current in the metal conductor.

2. The wind turbine generator of claim 1 wherein each flux member is formed of two mating parts and wherein the number of magnets is equal to the number of flux members.

3. The wind turbine generator of claim 2 wherein the stator contains three transverse rows of flux members and the housing contains three transverse rows of magnets.

4. The wind turbine generator of claim 3 wherein the rows of flux members or the rows of the magnets are offset physically to produce three alternating currents that are offset electrically.

5. The wind turbine generator of claim 4 wherein the flux members comprise sintered nickel and iron.

6. The wind turbine generator of claim 5 wherein the magnets comprise neodymium, iron, and boron.

7. The wind turbine generator of claim 6 wherein the flux members have upper surfaces that are rounded.

8. The wind turbine generator of claim 2 wherein the flux members have a width, wherein adjacent flux members are separated by a gap, and wherein the ratio of the width to the gap is at least about 20.

9. The wind turbine generator of claim 8 additionally comprising a generator circuit comprising two sets of independent conductors, one of which is connected in Delta and one of which is connected in Wye, that are rectified separately, offset in electrical phase by 30 degrees, and then combined to produce a low ripple direct current.

10. The wind turbine generator of claim 9 wherein the generator circuit combines the rectified outputs in switching semiconductors such that the outputs are combinable in voltage series or parallel or proportionately regulated to produce a constant voltage output.

11. A wind turbine generator system comprising a generator as described is claim 1 in combination with a turbine and linkage between the generator and turbine.

12. The wind turbine generator system of claim 11 wherein the turbine comprises a hub that is integral with the housing.

13. The wind turbine generator system of claim 12 wherein each flux member is formed of two mating parts.

14. The wind turbine generator system of claim 13 wherein the stator contains three transverse rows of flux members and the housing contains three transverse rows of magnets.

15. The wind turbine generator system of claim 14 wherein the rows of flux members or the rows of the magnets are offset physically to produce three alternating currents that are offset electrically.

16. An apparatus for converting mechanical energy into electrical energy and for converting electrical energy into mechanical energy, the apparatus comprising:
(a) a stator comprising:
  (i) an inner cylinder having a radial exterior wall, an axis, and a diameter;
  (ii) a transverse row of an even number of identical molded magnetic flux members mounted on the exterior wall of the inner cylinder, each flux member having a central opening to define a continuous transverse channel around the exterior wall of the cylinder, each flux member made from a material having a high magnetic permeability; and
  (iii) a metal conductor running through the continuous transverse channel defined by the flux members, the conductor having two ends to carry alternating current; and
(b) a rotating housing comprising:
  (i) an outer cylinder having a radial interior wall, an axis that is coaxial with the axis of the stator inner cylinder, and a diameter that is greater than the diameter of the stator inner cylinder, the outer cylinder positioned in an overlapping relationship with the stator inner cylinder; and
  (ii) a transverse row of identical permanent magnets mounted on the interior wall of the outer cylinder, the number of magnets being equal to twice the number of flux members, each magnet having a North and South pole oriented radially, the magnets having alternating North and South poles;

such that a supplied rotation of the housing causes the magnets to induce magnetic fields in the flux members that induce an alternating current in the metal conductor and such that a supplied alternating current in the metal conductor induces magnetic fields in the flux members that create rotation of the housing.

17. The apparatus of claim 16 wherein each flux member is formed of two mating parts.

18. The apparatus of claim 17 wherein the flux members comprise sintered nickel and iron.

19. The apparatus of claim 18 wherein the magnets comprise neodymium, iron, and boron.

20. The apparatus of claim 19 wherein the stator contains three transverse rows of flux members and the housing contains three transverse rows of magnets.

* * * * *